Oct. 1, 1963 E. L. JACOBSON 3,105,707
PLUMBING FITTING AND ESCUTCHEON ASSEMBLY THEREFOR
Filed Jan. 23, 1961 2 Sheets-Sheet 1
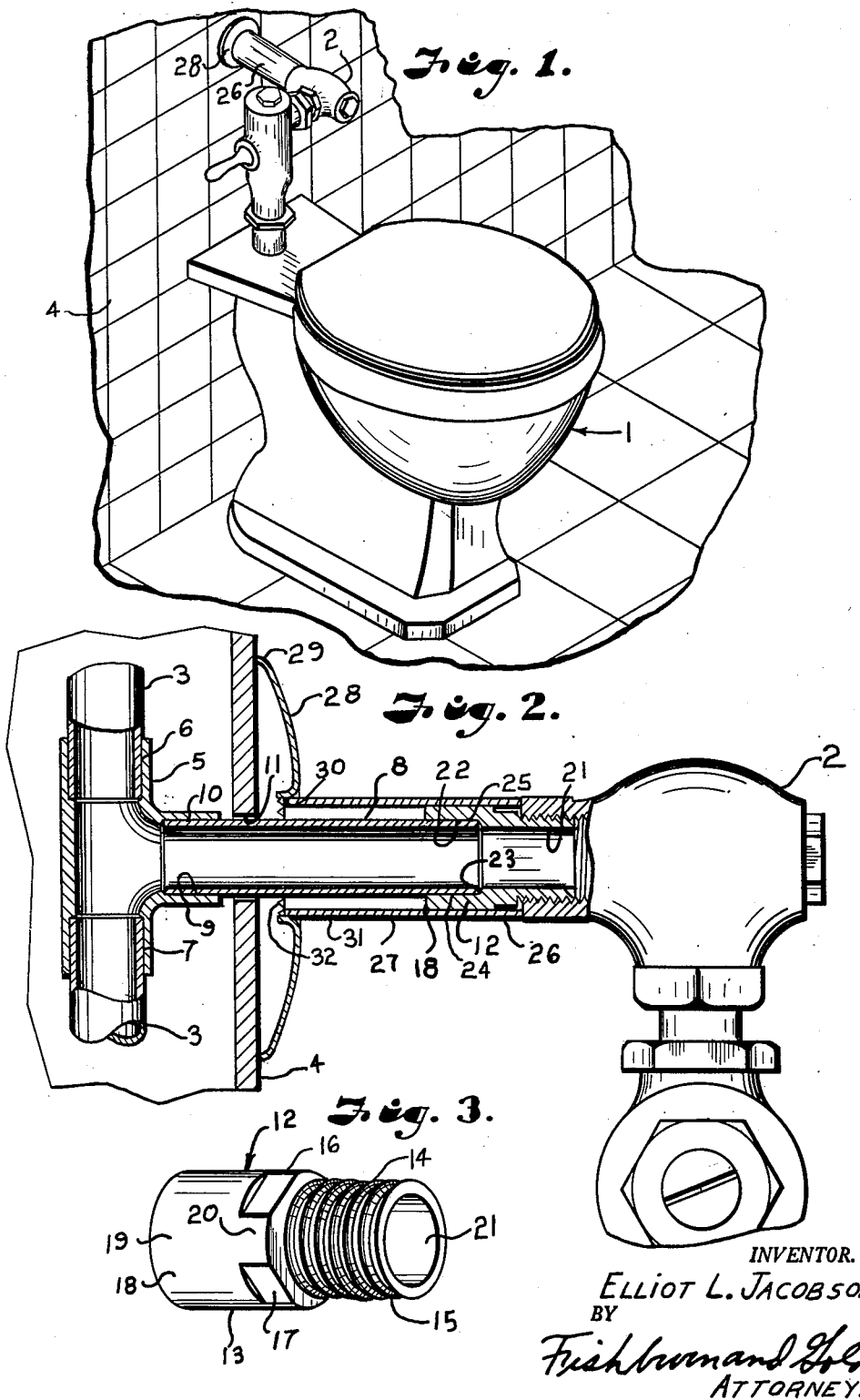
INVENTOR.
ELLIOT L. JACOBSON
BY
ATTORNEYS

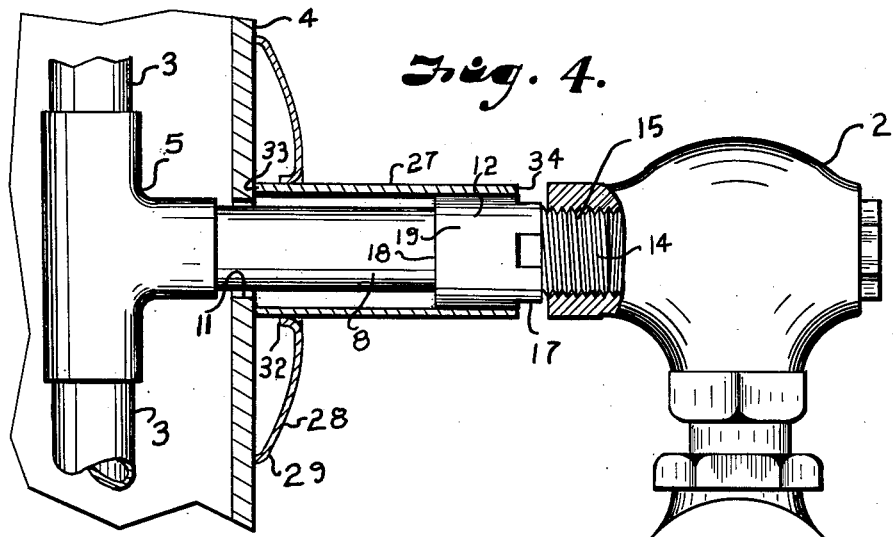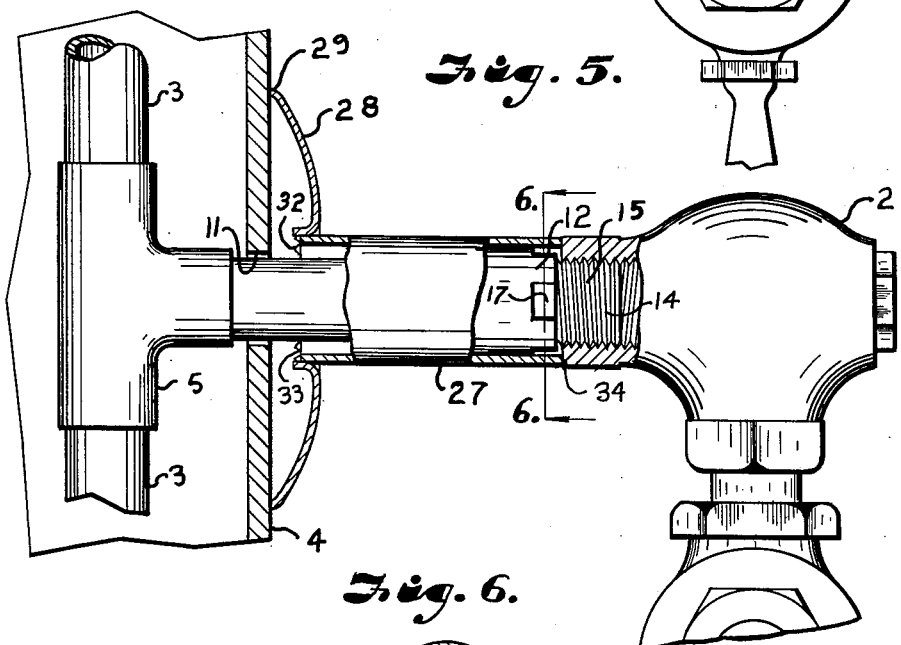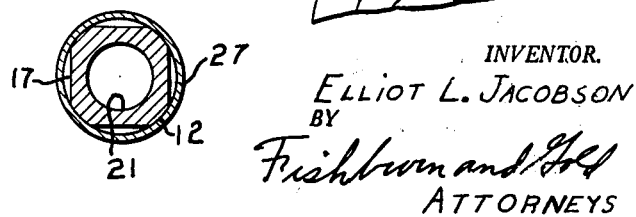

United States Patent Office 3,105,707
Patented Oct. 1, 1963

3,105,707
PLUMBING FITTING AND ESCUTCHEON
ASSEMBLY THEREFOR
Elliot L. Jacobson, % A. D. Jacobson Plumbing & Heating, 2030 Central, Kansas City, Mo.
Filed Jan. 23, 1961, Ser. No. 84,419
3 Claims. (Cl. 285—39)

This invention relates to an improved fitting for connecting a fluid carrying tube or pipe extending through a wall to a plumbing fixture and a decorative escutcheon assembly for finishing the installation.

In the art of installing plumbing fixtures such as toilets, wash basins and the like, it recently has been the common practice to install copper supply tubing in the walls of the building structure and sweat fittings thereto at positions where a connecting pipe or tube is to extend through the wall. Usually, the fittings secured to the tubing within the wall have a threaded connector or adapter secured thereto by sweating for receiving a length of threaded pipe which extends through a hole in the wall and outwardly a distance sufficient to reach the appliance being installed. Since there are usually variations in the spacing of the appliance from the wall due to deviations in the position of the sewer pipe, different wall thickness and the like, it has been generally necessary for the plumber to cut and rethread the pipe extension after assembly with the tubing fitting to obtain the proper connecting length. It is known that threaded connector fittings and threaded pipe extensions are relatively expensive and, also, that when the threading operation is proceeding the torque forces produced thereby are resisted by the sweated joint within the wall which often results in breakage or leakage at the sweated joint. Also, when, for example, a flush valve is screwed onto the outwardly extending end of the pipe, severe torque is placed on the sweated joint which often promotes the same undesirable consequences. In addition, the threading of the extending end of the pipe is time-consuming and requires specialized equipment which may be difficult to use in close quarters.

It is also common practice to provide an escutcheon tube and plate to cover the unsightly tube extension and wall hole; however, heretofore such decorative escutcheon assemblies have usually been of a length to extend from the wall to a valve or other fitting secured on said pipe extension.

The principal objects of the present invention are: to overcome the disadvantages of the above-described conventional structure by providing an adapter fitting permitting the use of non-threaded tubing extensions for connecting supply tubing to plumbing fixtures; to provide a decorative escutcheon assembly which remains firmly in place by cooperating with the adapter fitting although of a length which will not extend from the wall to the valve of the fixture; to provide such an adapter fitting which permits a screw connection to be made on an unthreaded tube extending through a wall without inducing torque forces resisted by sweated joints and particularly joints contained within the wall; to provide such an adapter fitting which supports a chrome escutcheon tube and plate while being completely covered from view thereby; to provide such an adapter fitting which eliminates the need for a threaded connector normally used in the wall; to provide such a fitting and escutcheon assembly combination which is quickly and easily used wherever exposed pipe or tubing extends from the wall for connection with plumbing fixtures; to provide such a combination which permits heretofore unknown ease of "roughing in" by allowing the plumber to install an easily cut tube extension of any excessive length rather than taking the time and effort to carefully estimate the exact length of threaded pipe extension needed; and to provide such a plumbing fitting and escutcheon assembly combination which is inexpensive to produce and highly efficient for the purpose intended.

Other objects and advantages of this invention will become apparent from the following description taken in connection with the accompanying drawings wherein are set forth by way of illustration and example certain embodiments of this invention.

FIG. 1 is a perspective view of a toilet fixture after having the flush valve thereof secured to extension tubing with the new adapter fitting and the adapter and tubing covered by the escutcheon assembly.

FIG. 2 is a sectional view through the supply tubing contained in the wall showing the sweated fitting thereon.

FIG. 3 is a perspective view of the adapter fitting of this invention showing transversely extending flats thereon adapted for being grasped by a wrench.

FIG. 4 is a sectional view through the escutcheon assembly showing the position thereof with respect to the adapter fitting when a flush valve is being screwed onto said fitting.

FIG. 5 is a sectional view similar to FIG. 4 but showing the escutcheon assembly in finished position.

FIG. 6 is a sectional view through the adapter fitting taken on the line 6—6, FIG. 5, showing the tight fitting relationship between the escutcheon tube and the adapter fitting.

Referring to the drawings in more detail:

The reference numeral 1 generally indicates a toilet fixture having a flush valve 2 of any one of the several types normally associated therewith. The toilet 1 is connected to a water supply provided by copper supply tubing 3 contained within the wall 4 of the room containing the toilet fixture. The tubing 3 is associated with a T-fitting 5 which is secured thereto by means of sweated joints 6 and 7. A short piece of pipe or tubing 8 preferably but not necessarily of a similar material as the supply tubing 3 is secured in the transverse receiving socket 9 of the T-fitting 5 by means of a sweated joint 10. The tubing 8 extends through a bore hole or opening 11 in the wall 4 for the purpose of providing a flow path from the supply tubing 3 to the toilet fixture 1.

The adapter fitting 12 comprises an elongated substantially cylindrical body 13 having a forward portion 14 terminating in an externally threaded extension 15. The body 13 also exhibits an intermediate portion 16 having a plurality of opposed transversely extending flats 17 thereon adapted for being grasped by a wrench (not shown) and a rearward portion 18 exhibiting an external cylindrical supporting surface 19 having a transverse width or diameter not less than the largest diameter of either the forward portion 14 or the intermediate portion 16. The supporting surface 19 preferably extends into the intermediate portion 16 forming cylindrical segments 20 between the flats 17 which segments perform the same function as the supporting surface 19 as will be apparent hereinafter. The adapter fitting 12 contains a bore 21 extending longitudinally therethrough and being of larger diameter adjacent the rearward portion 18 than adjacent the forward portion 14 to form a rearwardly opening socket 22 terminating in an annular internal shoulder 23.

In securing the adapter fitting 12 to the tubing 8, the outwardly extending end 24 thereof is severed to the proper length from the wall after such length can be easily determined with accuracy, that is, after the toilet fixture 1 has been mounted in its final position. The tubing 8, being copper, is easily severed. The rearward portion 18 of the adapter fitting 12 is placed over the extending end 24, preferably to the extent that the tubing 8 abuts against the shoulder 23 filling the socket 22. A sweated joint 25 may then be formed to retain the adapter fitting 12 thereon.

An escutcheon assembly 26 for use in combination with the adapter fitting 12 is comprised of a tube 27 preferably chrome plated at least on the outer surface thereof and a plate 28 also preferably chrome plated to provide a decorative appearance. The escutcheon assembly 26 is adapted to cover the externally extending portion of the tubing 8 and the wall hole or opening 11 through which the tubing extends. The tube 27 has an internal transverse width or diameter substantially equal to the transverse width or diameter of the supporting surface 19, but yet with slight clearance therebetween permitting the tube 27 to slide thereover. The plate 28 is here illustrated as annular in shape but also may be square, triangular or of other shape without departing from the spirit of this invention. The outer edge 29 of the plate 28 is displaced longitudinally of the inner edge 30 a distance approximately the longitudinal width of the intermediate portion 16 of the fitting 12. The inner edge 30 is circular in shape having a diameter substantially equal to the diameter of the outer surface 31 of the tube 27. The inner edge 30 is provided with serrations or spring fingers 32 which are adapted to grasp the outer surface 31 so as to firmly retain the plate 28 in a desired position on the tube 27 while permitting the position to be changed when necessary.

The tube 27 is slipped over the fitting 12 and slidably urged longitudinally until the rearward end 33 abuts against the wall 4. The tube 27 is then cut to a length whereby the forward end 34 thereof covers most of the supporting surface 19 but permits access to the flats 17, FIG. 4. After the plate 28 is assembled with the tube 27, the flush valve 2 may be screwed over the externally threaded extension 15 while the adapter fitting 12 is retained in a non-rotating position by means of a wrench (not shown) grasping the flats 17. The retention of the fitting 12 by the wrench prevents torque arising from the screwing of the flush valve 2 from being transmitted by the tubing 8 to the sweated joints 6, 7, 10 and 25. After the flush valve 2 has been secured to the adapter fitting 12 so as to provide a watertight connection therebetween, the tube 27 is slid forwardly until the forward end 34 abuts against the flush valve 2 covering the flats 17 and cylindrical segments 20. The plate 28 is then urged rearwardly until the outer edge 29 abuts against the wall 4 (FIG. 5). The tube 27 is supported firmly by means of contact with the supporting surface 19 and cylindrical segments 20 which are of substantial length. The supported tube 27 maintains the plate 28 tightly abutting the wall 4. The escutcheon assembly 26 in cooperation with the fitting 12 thus offers a firm decorative covering over the opening 11 and tubing 8.

It is apparent that I have provided a fitting and decorative escutcheon device which permits the water supply connection to bathroom appliances to be made with ease and facility without the danger of breaking sweated joints, eliminates the need for heavy extending pipe and the re- threading thereof, eliminates the need for threaded fittings contained in the wall, and provides a firm, decorative finish for the installation.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In combination, an adapter fitting for connecting a fluid carrying pipe extending through a wall to a plumbing fixture and a decorative escutcheon assembly for finishing the installation; said fitting comprising an elongated body having a forward portion screwed to said plumbing fixture, a rearward portion and an intermediate portion and a bore longitudinally therethrough, said forward portion terminating in an externally threaded extension, said intermediate portion having an external gripping surface thereon adapted for being grasped by a wrench, said rearward portion exhibiting an external supporting surface having a transverse width not less than the maximum transverse width of either said forward or intermediate portions, a sweated joint connecting the fluid carrying pipe to the rearward portion of said adapter, said escutcheon assembly including a tube having an internal transverse width substantially equal to the transverse width of said external supporting surface permitting said tube to slide thereover from a position covering said intermediate portion to a position exposing said intermediate portion to be gripped by a wrench to hold the same and prevent torsional stress to said sweated joint while screwing the plumbing fixture to said adapter.

2. In combination, an adapter fitting for connecting a fluid carrying pipe extending through a wall to a plumbing fixture and a decorative escutcheon assembly for finishing the installation; said adapter fitting comprising an elongated body having a forward portion screwed to said plumbing fixture, a rearward portion and an intermediate portion and a bore longitudinally therethrough, said forward portion terminating in a threaded extension, said intemediate portion having means thereon adapted for being grasped by a wrench, said rearward portion exhibiting an external supporting surface having a transverse width not less than the maximum transverse width of either said forward of intermediate portions; a sweated joint connecting the fluid carrying pipe to the rearward portion of said adapter, said escutcheon assembly comprising a tube and a plate, said tube having an internal transverse width substantially equal to the transverse width of said external supporting surface but permitting said tube to slide thereover from a position covering said intermediate portion to a position exposing said intermediate portion to be gripped by a wrench to hold the same and prevent torsional stress to said sweated joint while screwing the plumbing fixture to said adapter, said plate having an outer edge and an inner edge, said outer edge being displaced longitudinally of said inner edge a distance approximating the longitudinal width of said intermediate portion, said inner edge being slidable over the outer surface of said tube and having means providing yieldable retention of said plate on said tube.

3. In combination, an adapter fitting for connecting a fluid carrying pipe extending through a wall to a plumbing fixture and a decorative escutcheon assembly for finishing the installation; said adapter fitting comprising a substantially cylindrical elongated body having a forward portion, a rearward portion and an intermediate portion and a bore longitudinally therethrough, said bore being of larger diameter adjacent said rearward portion than adjacent said forward portion for receiving said pipe and forming an annular internal shoulder, said forward portion terminating in an externally threaded extension screwed to said plumbing fixture, said intermediate portion having at least one transversely extending flat thereon adapted for being grasped by a wrench, said rearward portion exhibiting an external cylindrical supporting surface having a diameter not less than the largest diameter of either said forward or intermediate portions, a sweated joint connecting said pipe with the bore adjacent said rearward portion, said escutcheon assembly comprising a tube and a plate, said tube having an internal diameter substantially equal to the diameter of said external supporting surface but permitting said tube to slide thereover from a position covering said intermediate portion to a position exposing said intermediate portion to be gripped by a wrench to hold the same and prevent torsional stress to said sweated joint while screwing the plumbing fixture to said adapter, said plate being annular in shape and having an outer edge and an inner edge, said outer edge being displaced longitudinally of said inner edge a distance approximating the longitudinal width of said intermediate portion, said inner edge being slidable over the outer surface of said tube and having means providing yieldable retention of said plate on said tube.

References Cited in the file of this patent
UNITED STATES PATENTS

| | | |
|---|---|---|
| 638,611 | Totham | Dec. 5, 1899 |
| 1,326,626 | Wolfe | Dec. 30, 1919 |
| 1,334,072 | Bennett | Mar. 16, 1920 |
| 1,447,564 | Norlund et al. | Mar. 6, 1923 |
| 2,094,495 | Robinson et al. | Sept. 28, 1937 |
| 2,274,787 | Gruen | Mar. 3, 1942 |
| 2,708,449 | Keithley | May 17, 1955 |